(12) United States Patent
Orshansky et al.

(10) Patent No.: US 11,522,725 B2
(45) Date of Patent: Dec. 6, 2022

(54) REDUCING AMOUNT OF HELPER DATA IN SILICON PHYSICAL UNCLONABLE FUNCTIONS VIA LOSSY COMPRESSION WITHOUT PRODUCTION-TIME ERROR CHARACTERIZATION

(71) Applicant: Board of Regents, The University of Texas System, Austin, TX (US)

(72) Inventors: Michael Orshansky, Austin, TX (US); Ye Wang, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 398 days.

(21) Appl. No.: 16/498,587

(22) PCT Filed: Mar. 28, 2018

(86) PCT No.: PCT/US2018/024952
§ 371 (c)(1),
(2) Date: Sep. 27, 2019

(87) PCT Pub. No.: WO2018/183572
PCT Pub. Date: Oct. 4, 2018

(65) Prior Publication Data
US 2020/0052913 A1 Feb. 13, 2020

Related U.S. Application Data

(60) Provisional application No. 62/478,130, filed on Mar. 29, 2017, provisional application No. 62/478,117, filed on Mar. 29, 2017.

(51) Int. Cl.
*H04L 9/32* (2006.01)
*G06F 21/73* (2013.01)
*H04L 9/08* (2006.01)

(52) U.S. Cl.
CPC ............ *H04L 9/3278* (2013.01); *G06F 21/73* (2013.01); *H04L 9/0866* (2013.01);
(Continued)

(58) Field of Classification Search
CPC . H04L 9/3278; H04L 9/0866; H04L 2209/12; H04L 2209/30; H04L 2209/34; G06F 21/73
See application file for complete search history.

(56) References Cited

U.S. PATENT DOCUMENTS 8,667,265 B1 * 3/2014 Hamlet ................. H04L 9/3278
713/185
9,082,514 B1 * 7/2015 Trimberger ............ G11C 29/06
(Continued)

FOREIGN PATENT DOCUMENTS

EP 2773061 B1 9/2014

OTHER PUBLICATIONS

International Search Report for International Application No. PCT/US2018/024952 dated Jul. 31, 2018, pp. 1-5.
(Continued)

*Primary Examiner* — David Garcia Cervetti
(74) *Attorney, Agent, or Firm* — Robert A. Voigt, Jr.; Shackelford, Bowen, McKinley & Norton, LLP (57) ABSTRACT

A method, system and computer program product for reducing the amount of helper data that needs to be stored using two innovative techniques. The first technique uses bit-error-rate (BER)-aware lossy compression. By treating a fraction of reliable bits as unreliable, it effectively reduces the size of the reliability mask. With the view of practical costs of production-time error characterization, the second technique enables economically feasible across-temperature per-bit BER evaluation for use in a number of fuzzy extractor optimizations based on bit-selection to reduce overall BER
(Continued)

(with or without subsequent compression) using room-temperature only production-time characterization. The technique is based on stochastic concentration theory and allows efficiently forming confidence intervals for average across-temperature BER of a selected set of bits. By using these techniques, it is economically feasible to achieve a dramatic reduction in the amount of helper data that needs to be stored in non-volatile memory and/or one-time-programmable memory.

3 Claims, 7 Drawing Sheets

(52) U.S. Cl.
CPC ...... *H04L 2209/12* (2013.01); *H04L 2209/30* (2013.01); *H04L 2209/34* (2013.01)

(56) References Cited

U.S. PATENT DOCUMENTS

| | | | |
|---|---|---|---|
| 9,225,512 B1* | 12/2015 | Trimberger | H04L 9/0866 |
| 9,262,256 B2 | 2/2016 | Mathew et al. | |
| 9,584,329 B1* | 2/2017 | Trimberger | H04L 9/3278 |
| 9,672,342 B2* | 6/2017 | Walsh | G06F 21/32 |
| 9,767,015 B1* | 9/2017 | McKelvie | G06F 12/0238 |
| 10,089,220 B1* | 10/2018 | McKelvie | G06F 9/544 |
| 10,103,733 B1* | 10/2018 | Gurrieri | H03K 19/00315 |
| 10,235,517 B2* | 3/2019 | Lao | G06F 21/73 |
| 11,218,306 B2* | 1/2022 | Maes | H03M 13/19 |
| 2008/0112596 A1* | 5/2008 | Rhoads | G07D 7/12 |
| | | | 382/115 |
| 2009/0106626 A1* | 4/2009 | Hou | H03M 13/1197 |
| | | | 714/E11.017 |
| 2009/0282259 A1* | 11/2009 | Skoric | G06Q 20/341 |
| | | | 726/20 |
| 2011/0135013 A1* | 6/2011 | Wegener | H03M 7/40 |
| | | | 375/241 |
| 2011/0191837 A1* | 8/2011 | Guajardo Merchan | |
| | | | H04L 9/3278 |
| | | | 726/6 |
| 2011/0215829 A1* | 9/2011 | Guajardo Merchan | |
| | | | H04L 9/3278 |
| | | | 326/8 |
| 2011/0286599 A1* | 11/2011 | Tuyls | G06F 21/602 |
| | | | 380/278 |
| 2012/0072737 A1* | 3/2012 | Schrijen | G06F 7/588 |
| | | | 713/189 |
| 2012/0183135 A1* | 7/2012 | Paral | G09C 1/00 |
| | | | 380/44 |
| 2013/0194886 A1* | 8/2013 | Schrijen | H04L 9/0866 |
| | | | 365/226 |
| 2013/0222115 A1* | 8/2013 | Davoodi | H04Q 9/00 |
| | | | 340/10.1 |
| 2013/0234771 A1* | 9/2013 | Simons | H04L 9/0866 |
| | | | 327/215 |
| 2013/0246881 A1* | 9/2013 | Goettfert | H03M 13/03 |
| | | | 714/752 |
| 2014/0091832 A1* | 4/2014 | Gotze | G09C 1/00 |
| | | | 326/8 |
| 2014/0108786 A1* | 4/2014 | Kreft | G06Q 20/3825 |
| | | | 713/194 |
| 2014/0189365 A1* | 7/2014 | Cox | G06F 21/72 |
| | | | 713/189 |
| 2014/0218067 A1* | 8/2014 | Li | H04L 9/3278 |
| | | | 326/8 |
| 2014/0325237 A1* | 10/2014 | Van Der Leest | H04L 9/0866 |
| | | | 713/189 |
| 2014/0327469 A1* | 11/2014 | Pfeiffer | H03K 19/003 |
| | | | 326/8 |
| 2015/0086016 A1* | 3/2015 | Oshida | H04L 9/3236 |
| | | | 380/255 |
| 2015/0178143 A1* | 6/2015 | Mathew | G11C 7/24 |
| | | | 714/5.1 |
| 2015/0188718 A1* | 7/2015 | Falk | H04L 9/0816 |
| | | | 380/278 |
| 2015/0195088 A1* | 7/2015 | Rostami | H04L 9/3278 |
| | | | 380/28 |
| 2015/0200775 A1* | 7/2015 | Guajardo Merchan | |
| | | | G06F 21/73 |
| | | | 380/28 |
| 2015/0234751 A1* | 8/2015 | Van Der Sluis | G06F 12/1408 |
| | | | 713/193 |
| 2015/0269378 A1* | 9/2015 | Falk | H04L 63/105 |
| | | | 726/6 |
| 2016/0087805 A1* | 3/2016 | Li | H04L 9/3278 |
| | | | 713/193 |
| 2016/0148679 A1* | 5/2016 | Yoshimoto | G11C 13/004 |
| | | | 365/148 |
| 2016/0148680 A1* | 5/2016 | Yoshimoto | G11C 13/0059 |
| | | | 365/148 |
| 2016/0179896 A1* | 6/2016 | Finlay | G06F 16/24561 |
| | | | 707/693 |
| 2016/0182045 A1* | 6/2016 | Mai | H04L 9/3278 |
| | | | 326/8 |
| 2016/0269186 A1* | 9/2016 | Wallrabenstein | G06F 21/31 |
| 2016/0328578 A1* | 11/2016 | Plusquellic | G06F 21/604 |
| 2016/0373264 A1* | 12/2016 | Katoh | H01L 45/08 |
| 2017/0063559 A1* | 3/2017 | Wallrabenstein | H04L 9/085 |
| 2017/0141929 A1* | 5/2017 | Afghah | H04L 9/0866 |
| 2017/0149572 A1* | 5/2017 | Wallrabenstein | |
| | | | H03K 19/17748 |
| 2017/0180140 A1* | 6/2017 | Mai | G06F 21/72 |
| 2017/0242660 A1* | 8/2017 | Katoh | G11C 13/0007 |
| 2017/0310489 A1* | 10/2017 | Van Der Sluis | H04L 9/3278 |
| 2017/0344760 A1* | 11/2017 | Jennings | G09C 1/00 |
| 2017/0344761 A1* | 11/2017 | Jennings | H04L 9/3236 |
| 2017/0364709 A1* | 12/2017 | Plusquellic | G06F 21/73 |
| 2018/0004444 A1* | 1/2018 | Murray | G06F 3/0673 |
| 2018/0006813 A1* | 1/2018 | Van Der Leest | H04L 9/0869 |
| 2018/0167391 A1* | 6/2018 | Lawson | H04W 12/06 |
| 2018/0183589 A1* | 6/2018 | Danger | H04L 9/0877 |
| 2018/0183614 A1* | 6/2018 | Danger | H04L 9/0866 |
| 2018/0205901 A1* | 7/2018 | Okura | H01L 27/14643 |
| 2018/0241557 A1* | 8/2018 | Maes | H04L 9/0866 |
| 2018/0270014 A1* | 9/2018 | Muratani | H04L 9/0866 |
| 2018/0329962 A1* | 11/2018 | Schrijen | G09C 1/00 |
| 2019/0026457 A1* | 1/2019 | Plusquellic | G06F 21/70 |
| 2019/0116052 A1* | 4/2019 | Kim | H04L 9/3278 |
| 2019/0147967 A1* | 5/2019 | Tuyls | G11C 17/18 |
| | | | 365/96 |
| 2019/0156066 A1* | 5/2019 | Foster | G06F 21/72 |
| 2019/0165958 A1* | 5/2019 | Guajardo Merchan | |
| | | | H04L 9/3278 |
| 2019/0221139 A1* | 7/2019 | Schrijen | H04L 9/0866 |
| 2019/0349207 A1* | 11/2019 | Merchan | H04L 9/3278 |
| 2019/0349208 A1* | 11/2019 | Merchan | H04L 9/3278 |
| 2019/0385489 A1* | 12/2019 | Norrman | H04L 9/0869 |
| 2020/0052913 A1* | 2/2020 | Orshansky | H04L 9/0866 |
| 2020/0076604 A1* | 3/2020 | Argones Rua | H04L 9/3278 |
| 2021/0200559 A1* | 7/2021 | Chamberlain | G06F 3/0683 |

OTHER PUBLICATIONS

Written Opinion of the International Searching Authority for International Application No. PCT/US2018/024952 dated Jul. 31, 2018, pp. 1-5.
Matthias Hiller, "Key Derivation with Physical Unclonable Functions," Dissertation, Technical University of Munich, 2016, pp. 1-153.
Salamatian et al., "Maximum Entropy Functions: Approximate Gacs-Korner for Distributed Compression," Apr. 14, 2016, pp. 1-6.
Delvaux et al., "Helper Data Algorithms for PUF-Based Key Generation: Overview and Analysis, IEEE Transactions on Computer-Aided Design of Integrated Circuits and Systems," vol. 34, No. 6, Jun. 2015, pp. 1-14.
Dodis et al., Fuzzy Extractors: How to Generate Strong Keys from Biometrics and Other Noisy Data, Eurocrypt, 2004, Springer LNCS 3027, pp. 523-540.

(56) References Cited

OTHER PUBLICATIONS

Hiller et al., "Increasing the Efficiency of Syndrome Coding for PUFs with Helper Data Compression," Design, Automation & Test in Europe Conference & Exhibition (DATE), Mar. 24-28, 2014, pp. 1-6.

Roel Maes, "An Accurate Probabilistic Reliability Model for Silicon PUFs," International Conference on Cryptographic Hardware and Embedded Systems, 2013, pp. 73-89.

Van Den Berg et al., "Bias-Based Modeling and Entropy Analysis of PUFs," Proceedings of the 2013 ACM Workshop on Trustworthy Embedded Devices, Berlin, Germany, Nov. 4, 2013, pp. 1-8.

Wang et al., "Efficient Helper Data Reduction in SRAM PUFs via Lossy Compression," Design, Automation and Test in Europe (DATE), Dresden, Germany, Mar. 19-23, 2018, pp. 1453-1458.

\* cited by examiner

REDUCING AMOUNT OF HELPER DATA IN SILICON PHYSICAL UNCLONABLE FUNCTIONS VIA LOSSY COMPRESSION WITHOUT PRODUCTION-TIME ERROR CHARACTERIZATION

TECHNICAL FIELD

The present invention relates generally to physical unclonable functions, and more particularly to reducing the amount of helper data in silicon physical unclonable functions via lossy compression without production-time error characterization.

BACKGROUND

In cryptography, a physical unclonable function ("PUF") is a physical entity that is embodied in a physical structure and is easy to evaluate but hard to predict. Such PUFs may be easy to make but practically impossible to duplicate, even given the exact manufacturing process that produced it.

PUFs depend on the uniqueness of their physical microstructure. This microstructure depends on random physical factors introduced during manufacturing. These factors are unpredictable and uncontrollable which makes it virtually impossible to duplicate or clone the structure.

Rather than embodying a single cryptographic key, PUFs implement challenge-response authentication to evaluate this microstructure. When a physical stimulus is applied to the structure, it reacts in an unpredictable (but repeatable) way due to the complex interaction of the stimulus with the physical microstructure of the device. This exact microstructure depends on physical factors introduced during manufacture which are unpredictable (like a fair coin). The applied stimulus is called the challenge, and the reaction of the PUF is called the response. A specific challenge and its corresponding response together form a challenge-response pair ("CRP"). The device's identity is established by the properties of the microstructure itself. As this structure is not directly revealed by the challenge-response mechanism, such a device is resistant to spoofing attacks. In some PUFs, such as "weak PUFs," the challenge is a simple act of powering up a circuit.

The key distinction among different PUF constructions is between strong and weak PUFs, based on the rate at which the number of CRPs grows with the size of physical realization of a PUF. Weak PUFs are characterized by a small number of CRPs while strong PUFs are systems with a large number or even exponential number of CRPs.

Silicon physical unclonable functions (PUFs) are widely used in emerging hardware security applications, such as device identification, authentication, and cryptographic key generation. As discussed above, PUFs generate unique randomness by exploiting inherent random process variation during fabrication. Among them, Static Random-Access Memory (SRAM) PUFs that produce unique signatures with power-up states are appealing because SRAMs are widely available standard components in a multitude of existing integrated circuits (ICs).

However, the major challenge of utilizing silicon PUFs, including SRAM PUFs, lies in the reliability of responses. Ideally, an SRAM PUF bit produces a unique and identical power-up value under each evaluation. In fact, power-up is a cell-specific stochastic process determined jointly by device mismatch, instantaneous noise, and environment variation.

The standard method to ensure PUF reliability in the key derivation context is to use a fuzzy extractor that utilizes an error correction code (ECC). A fuzzy extractor algorithm involves two phases: enrollment and reconstruction. During enrollment, an ECC is used to encode raw PUF responses and compute the code syndrome to be used as helper data for reconstruction. The helper data is assumed to be public and is stored in non-volatile memory.

In some applications of PUF-based key generation for original silicon manufacturers, one-time-programmable (OTP) memory (e.g., fuses) is preferred as it cannot be modified by an adversary. In these settings, the helper data needs to be stored on-die, prior to the package-level or board-level resources (e.g., high-capacity Flash memory) are available. However, in many platforms, e.g., field-programmable gate arrays (FPGAs), the amount of OTP memory available is severely limited. As a result, the amount of required helper data should be reduced.

SUMMARY

In one embodiment of the present invention, a method for reducing the amount of helper data that needs to be stored comprises determining individual cell bit-error-rates of a physical unclonable function. The method further comprises formulating a lossy compression problem using the determined individual cell bit-error-rates of the physical unclonable function. The method additionally comprises solving the formulated lossy compression problem. Furthermore, the method comprises storing a solution to the formulated lossy compression problem as a map representing reliable cells in a memory of a physical unclonable function system. Additionally, the method comprises constructing helper data to be utilized by a fuzzy extractor using the map representing reliable cells and error correction code helper data.

Other forms of the embodiment of the method described above are in a system and in a computer program product.

In another embodiment of the present invention, a method for reducing the amount of helper data that needs to be stored comprises extracting distribution of cells' across-temperature bit-error-rates using a population-based analysis at a technology development phase. The method further comprises measuring only nominal one-probabilities for each cell at a production phase. The method additionally comprises using the population-based analysis of the cells' across-temperature bit-error-rates for the measured nominal one-probabilities for each cell to derive a confidence level for an average across-temperature bit-error-rate of a set of cells. Furthermore, the method comprises optimizing a fuzzy extractor by identifying a subset of more reliable bits out of a population of physical unclonable function bits using the derived confidence level for the average across-temperature bit-error-rate of the set of cells.

Other forms of the embodiment of the method described above are in a system and in a computer program product.

In a further embodiment of the present invention, a method for helper data size reduction for strong physical unclonable functions comprises generating pseudo random numbers. The method further comprises inputting the generated pseudo random numbers to a strong physical unclonable function which outputs a set of responses to the inputted pseudo random numbers as input challenges that are stored in a one-dimensional indexed array. The method additionally comprises applying compression and confidence interval estimation techniques to form a compact representation of challenge response pairs of the strong physical unclonable function as entries of the array. Furthermore, the method comprises storing the representation as reduced helper data in a memory of a physical unclonable function system.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

As discussed in the Background section, the standard method to ensure PUF reliability in the key derivation context is to use a fuzzy extractor that utilizes an error correction code. A fuzzy extractor algorithm involves two phases: enrollment and reconstruction. During enrollment, an ECC is used to encode raw PUF responses and compute the code syndrome or code offset to be used as helper data for reconstruction. The helper data is assumed to be public and is stored in non-volatile memory. For key generation applications for original semiconductor manufacturers, helper data needs to be stored on the silicon die, prior to the package-level and/or board-level resources becoming available. Thus, for original semiconductor companies, one-time-programmable (OTP) memory (e.g., fuses) is preferred. An additional advantage of OTP is that it cannot be easily modified by an adversary. However, in many platforms, e.g., FPGAs, the amount of OTP memory available is severely limited. As a result, the amount of required helper data should be reduced.

The present invention allows a significant reduction of helper data size (HDS) through two innovative techniques. The first technique uses bit-error-rate (BER)-aware lossy compression by treating a fraction of the reliable bits as unreliable thereby effectively reducing the size of the map needed to represent these bits. With the view of practical costs of production-time error characterization, the second technique enables economically feasible across-temperature per-bit BER evaluation for use in a number of fuzzy extractor optimizations based on bit-selection to reduce overall BER (with or without subsequent compression) using room-temperature only production-time characterization. The method is based on stochastic concentration theory and allows efficient formation of confidence intervals for true average worst-case BER of a selected set of bits.

As discussed below in greater detail, the present invention proposes two innovative techniques based on lossy compression to reduce the total HDS dramatically and optimality. The first technique of lossy compression involves sacrificing a certain fraction of reliable bits by treating them as unreliable thereby leading to effective compression and large HDS reduction. In one embodiment, the present invention minimizes HDS when complete bit-specific error information is available across a range of operating conditions. To achieve that, a two-phase joint BER minimization and reliability mask compression algorithm is developed. A derived codebook is used to select a better solution that minimizes the overall average error of selected bits. This is done via the formulation using an integer linear programming problem (ILP). By utilizing the Lagrangian relaxation heuristics, the proposed ILP formulation can be decomposed into small separable sub-problems with efficient greedy-based linear-time solutions. Moreover, the proposed lossy compression algorithm does not leak any information about the key material.

The benefits of the technique are significant. Consider deriving a 128-bit key with a failure rate of $10^{-6}$ from the SRAM cells with an average BER of 10.22%. A direct implementation of fuzzy extractor requires 1060 raw source bits and 932 OTP bits for helper data. A bit-selection scheme with lossless compression reduces the helper data to 288 bits. After the proposed lossy compression, only 206 bits of HDS are needed, which is a 25% reduction, though at the cost of doubling the number of raw bits.

However, the approach above requires a possibly expensive BER characterization effort in which the reliability information under all possible conditions for each bit of each production PUF chip is extracted. Worst-case BER characterization across all working conditions may be unacceptably costly in a production environment.

The second technique practically enables multiple fuzzy extractor optimization strategies, which include lossy compression as described, other lossy compression strategies, lossless compression, or no compression methods (e.g., dark bit masking) that operate by identifying a subset of more reliable bits out of a population of all PUF bits. The second technique allows economically feasible across-temperature BER characterization operation via a construction of a tight confidence interval of the worst-case BER using multidimensional statistics. This is enabled by the observation that across-temperature (worst-case) BERs are correlated with their nominal-temperature one-probabilities for stable cells. The present invention performs a one-time large sample characterization experiment, predicts the average worst-case BERs based on nominal one-probabilities, and allows fuzzy extractor optimization strategies using the obtained confidence interval of the average worst-case BER for selected cells. By utilizing a stochastic concentration inequality, it is shown that for SRAM cells with sufficient size, the true average worst-case BER can be accurately estimated. The accuracy of estimation enables the guarantee of key reconstruction with overwhelmingly high probability.

The result is dramatic: compared to the maskless alternative, the method of the present invention still results in an overall 2.3× helper data reduction for extracting a 128-bit key and a 3× reduction for a 256-bit key, while allowing key reconstruction to fail in only $10^{0.5}$ cases.

Figure 1:
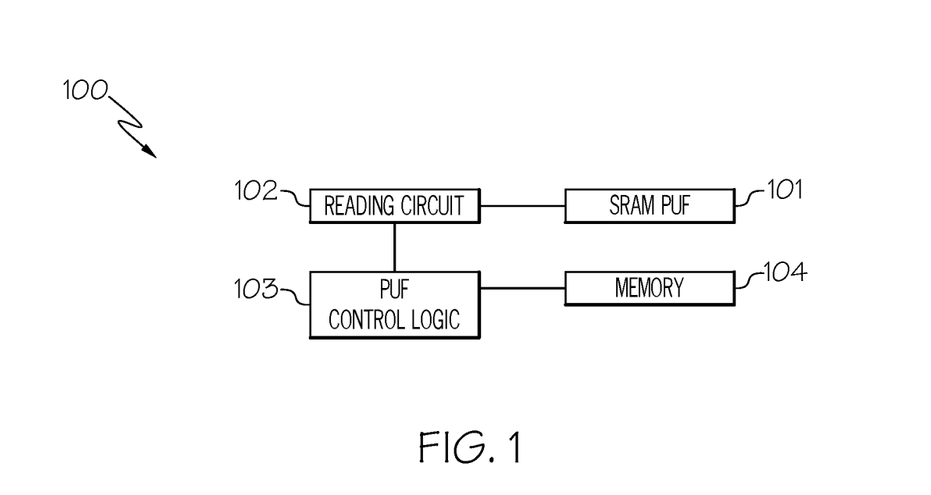
FIG. 1 illustrates an exemplary PUF system in accordance with an embodiment of the present invention.

Referring now to the Figures in detail, FIG. 1 illustrates an exemplary PUF system 100 in accordance with an embodiment of the present invention. PUF system 100 includes a Static Random-Access Memory (SRAM) PUF 101, which refers to SRAM being a source of PUF bits.

PUF system 100 further includes a reading circuit 102 for reading the contents from SRAM PUF 101.

Furthermore, PUF system 100 includes a PUF control logic 103 connected to reading circuit 102. PUF control logic 103 may be implemented in hardware on an integrated circuit. PUF control logic 103 may comprise a data processor (e.g., a central processing unit) for executing a software program to obtain the functionality of PUF control logic 103.

Additionally, PUF system 100 includes a memory 104 connected to PUF control logic 103. In one embodiment, memory 104 is non-volatile, writable memory, such as a flash memory, EPROM memory, EEPROM, e-fuses, etc. In one embodiment, memory 104 is a one-time-programmable (OTP) memory. In one embodiment, memory 104 stores helper data (further discussion of helper data provided below). In one embodiment, memory 104 stores a program for reducing the amount of helper data that needs to be stored as discussed below in connection with FIGS. 4-6. The instructions of this program may be executed by the data processor of PUF control logic 103. In one embodiment, memory 104 also stores helper data for PUF reconstruction.

Figure 3:
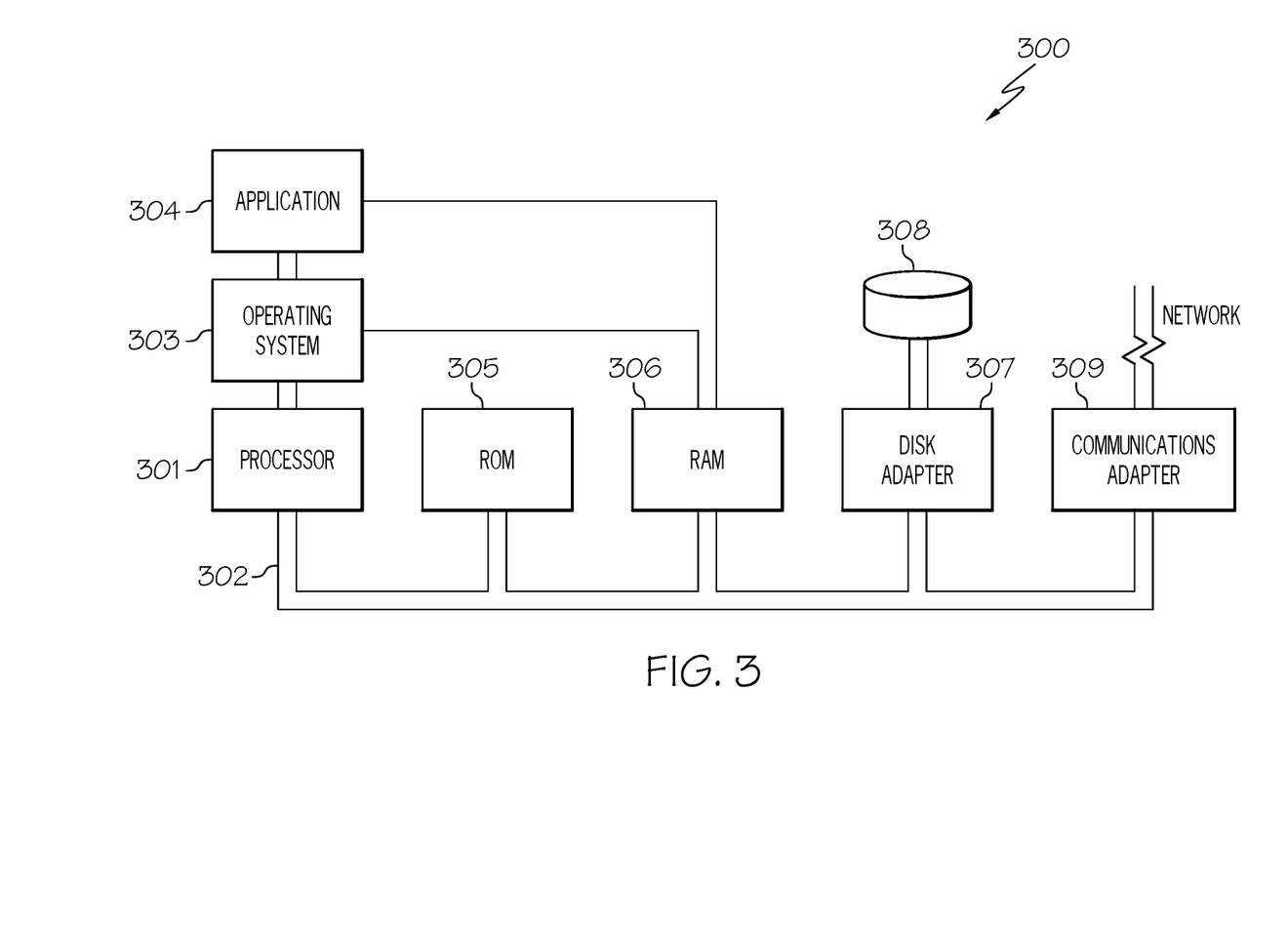
FIG. 3 illustrates a hardware configuration of a computing device which is representative of a hardware environment for practicing the present invention.
Figure 4:
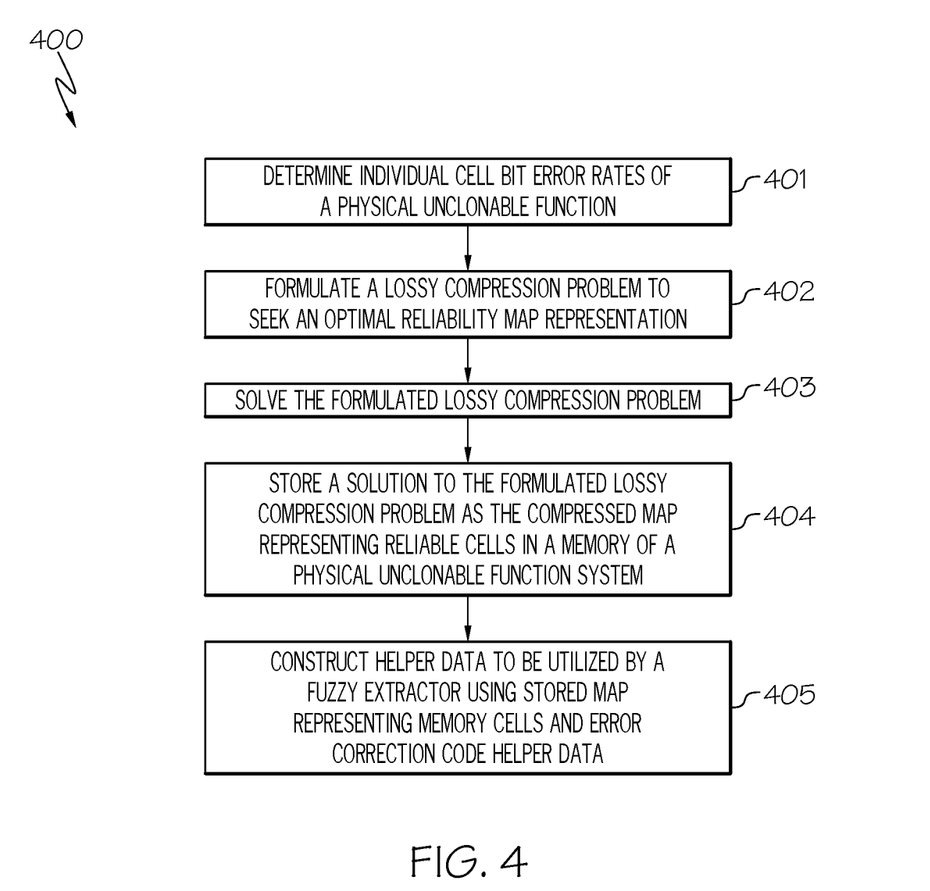
FIG. 4 is a flowchart of a method for reducing the helper data size by treating a certain fraction of reliable bits as being unreliable in accordance with an embodiment of the present invention.
Figure 5:
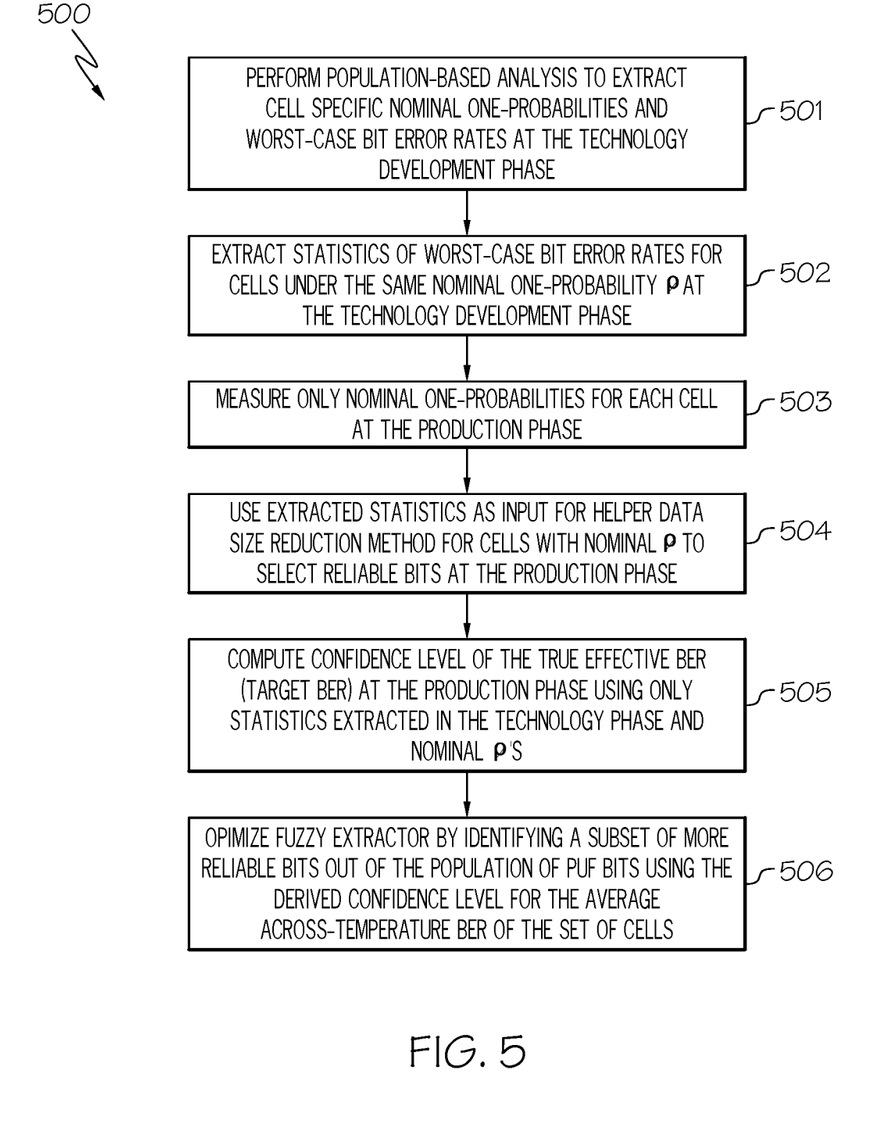
FIG. 5 is a flowchart of a method for bit-specific across-temperature BER characterization that enables HDS reduction and other fuzzy extractor optimizations in accordance with an embodiment of the present invention.
Figure 6:
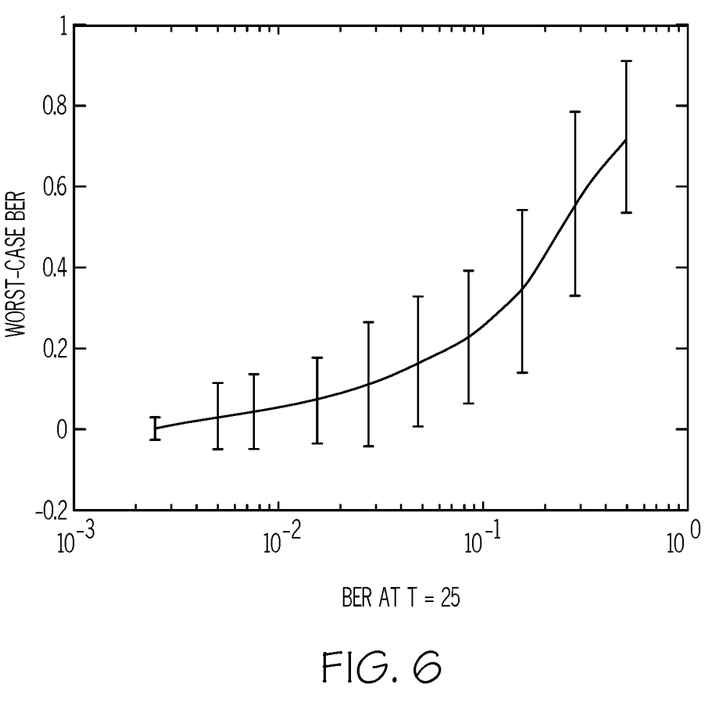
FIG. 6 is a graph depicting individual cell's maximum across-temperature BERs plotted against nominal-temperature one-probabilities in accordance with an embodiment of the present invention.

In one embodiment, the program for reducing the amount of helper data that needs to be stored, as discussed below in connection with FIGS. 4-6, is executed by a processor of a computing device. A description of an embodiment of the hardware configuration of such a computing device is provided further below in connection with FIG. 3.

In one embodiment, PUF control logic 103 is configured to receive the PUF data read by reading circuit 102 and to receive helper data from memory 104. Using a helper data algorithm (also referred to as a fuzzy extractor), which may be executed on PUF control logic 103, the PUF data obtained is processed using the helper data. As a result of this processing, the variation which may be present in the PUF data, is removed.

An explanation of using SRAM PUF 101 to create a cryptographic key involving the enrollment and reconstruction phases is discussed further below in connection with FIG. 2.

FIG. 1 is not to be limited in scope to the depicted elements. For example, PUF system 100 is not to be limited to using an SRAM PUF. Other PUFs could be used.

A discussion regarding the PUF-based key generation algorithm based on the fuzzy extractor (consists of two phases: enrollment and reconstruction) is now deemed appropriate.

Referring to the BER modeling and characterization, cell i is defined with the one-probability $p_i(T, Vdd)$ as the probability of returning a 1 from one random power up under temperature T and supply voltage Vdd. The enrollment response $X_i$'s are derived via majority voting under nominal voltage and temperature: $X_i=1$ if $p_i(T_{ref}, Vdd_{ref})>0.5$ and $X_i=0$ otherwise. BER $p_{ei}(T, Vdd)$ can be derived from one probability $p_i(T, Vdd)$ and enrollment response $X_i$ accordingly: $p_{ei}(T, Vdd)=p_i(T, Vdd)$ if $X_i=0$ and $p_{ei}(T, Vdd)=1-p_i(T, Vdd)$ if $X_i=1$. To guarantee key reconstruction under all possible environmental condition, one needs to ensure that even with the worst-case BERs $p_{wi}$, defined by $$p_{wi} = \max_{T \in [T_{min}, T_{max}], V_{dd} \in [V_{min}, V_{max}]} p_{ei}(T, V_{dd}),$$

the key is reproduced reliably.

Figure 2:
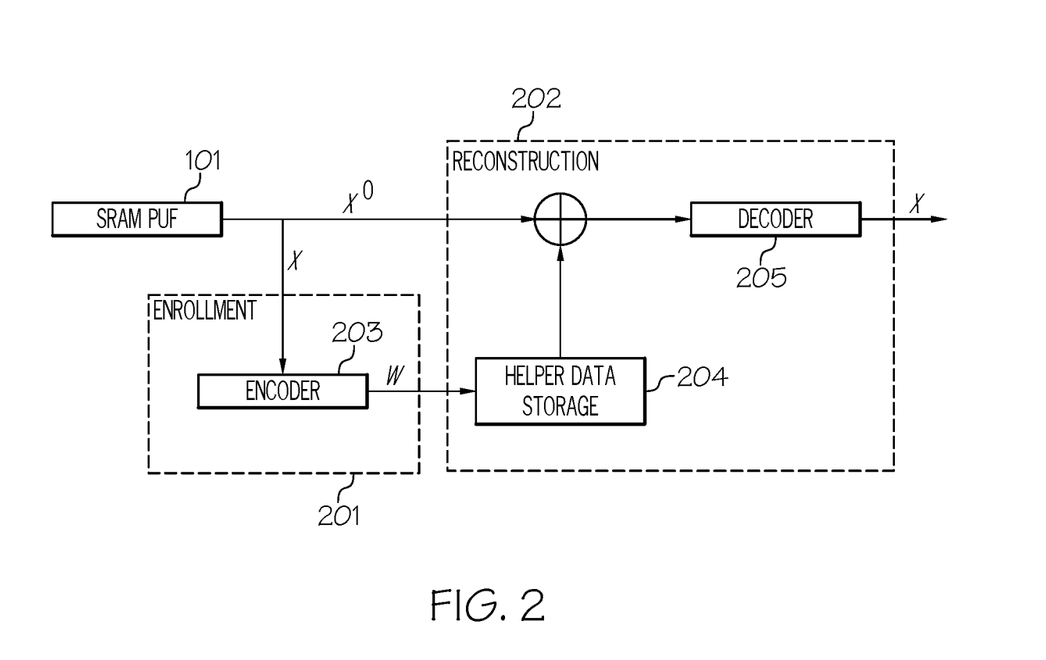
FIG. 2 shows a conventional PUF-based key generation flow in accordance with an embodiment of the present invention.

Referring to FIG. 2, FIG. 2 shows a conventional PUF-based key generation flow in accordance with an embodiment of the present invention. A fuzzy extractor consists of two phases: enrollment 201 and reconstruction 202. The following discussion of the present invention uses the linear code and syndrome-based fuzzy extractor for enrollment and reconstruction but the present invention can also be extended to using the code-offset-based fuzzy extractor or even non-linear codes. It is noted that in the discussion below, vectors and matrices are denoted with bold symbols with dimension on superscript, which can be dropped for convenience in case of no confusion. In the enrollment phase, noisy raw PUF responses X are fed into an encoder 203 for a code C(n,k,t) with length n, dimension k, error-correcting capacity t and parity-check matrix H to extract the syndrome $W=XH^T$ that is later used as helper data (stored in helper data storage 204) in reconstruction. Reconstruction phase 202 takes another PUF measurement $X^1$ and the previous helper data W as input, and calculates the XORed syndrome $S=X^1H^T \oplus W$. Due to linearity of codes, $S=(X \oplus X^1)H^T$. If the Hamming distance $HD(X,X^1)=HW(X \oplus X^1)$ is no larger than the error-correcting capacity t, $X^1$ can be decoded by decoder 205 to restore X. The code syndrome with length (n−k) needs to be stored in non-volatile memory, such as one-time-programmable (OTP) memory (e.g., memory 104).

Typical cryptographic applications pose security requirements on X in terms of conditional min-entropy $H_\infty(X|W)$. Introduction of helper data inevitably discloses partial information on the source bits X, and the left-over entropy of X conditioned on W is given by:

$H_\infty(X|W) \geq H_\infty(X)-(n-k)$.

The practical overhead of implementing fuzzy extractors depends on the choice of an error correction code which is largely determined by PUF noise level. For a given security level and reconstruction failure probability, helper data length of code syndrome scales quickly with the increase of the bit-error-rate (BER). For n bit responses with uniform BER $p_e$, the Hamming distance $HD(X,X^1)$ follows a binomial distribution $B(n,p_e)$. Therefore, the failure rate $P_{Fail}$ of reconstruction is $$P_{Fail} = 1 - F(t; n, p_e)$$

$$= \sum_{i=t+1}^{n} \binom{n}{i} p_e^i (1-p_e)^{(n-i)},$$

where $F(t;n,p_e)$ denotes the corresponding cumulative distribution function (CDF) of $B(n,p_e)$. For PUF responses with heterogeneous BERs $(p_{e1}, p_{e2}, \ldots, p_{en})$, Hamming distance $HD(X,X^1)$ follows a Poisson binomial distribution. In one embodiment, the present invention uses a binomial distribution with $p_e$ as the average $p_e = \sum_{i=1}^{n} p_{ei}/n$ as an approximation of the corresponding Poisson binomial distribution.

For ECCs with fixed block length n, there is a fundamental trade-off between dimension k and the error correction capacity t. Many SRAM PUF designs utilize concatenated codes with repetition codes as inner code and (shortened) BCH codes as outer code in the implementation of the fuzzy extractor. Concatenated codes are typically more efficient than single codes in terms of code length and HDS.

As discussed above, the program for reducing the amount of helper data that needs to be stored as discussed below in connection with FIGS. 4-7 is executed by a processor of a computing device. A description of an embodiment of the hardware configuration of such a computing device is provided below in connection with FIG. 3.

Referring now to FIG. 3, FIG. 3 illustrates a hardware configuration of computing device 300 which is representative of a hardware environment for practicing the present invention. Referring to FIG. 3, computing device 300 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for reducing the amount of helper data that needs to be stored as discussed further below in connection with FIGS. 4-6.

Referring again to FIG. 3, read-only memory ("ROM") 305 is coupled to system bus 302 and includes a basic input/output system ("BIOS") that controls certain basic functions of computing device 300. Random access memory ("RAM") 306 and disk adapter 307 are also coupled to system bus 302. It should be noted that software components including operating system 303 and application 304 may be loaded into RAM 306, which may be computing device's 300 main memory for execution. Disk adapter 307 may be an integrated drive electronics ("IDE") adapter that communicates with a disk unit 308, e.g., disk drive.

Computing device 300 may further include a communications adapter 309 coupled to bus 302. Communications adapter 309 interconnects bus 302 with an outside network thereby enabling computing device 300 to communicate with other devices.

Computing device 300 of FIG. 3 is not to be limited in scope to the elements depicted in FIG. 3 and may include fewer or additional elements than depicted in FIG. 3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
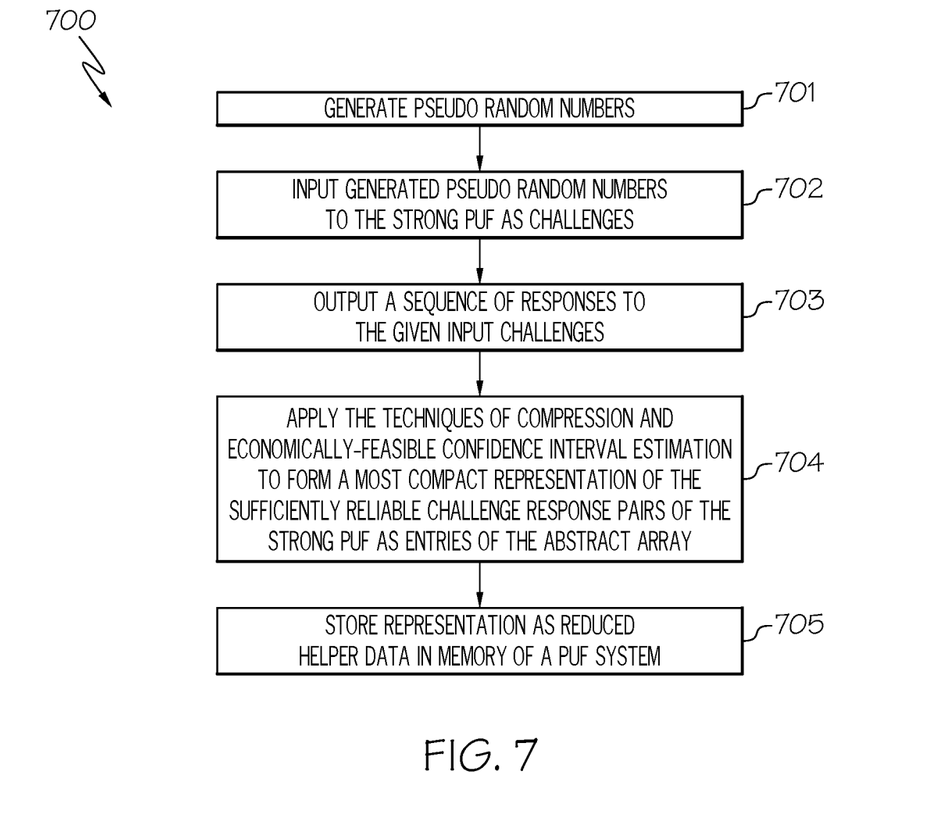
FIG. 7 is a flowchart of a method for helper data size reduction for strong PUFs in accordance with an embodiment of the present invention.

The principles of the present invention provide a means for reducing the helper data size as discussed below in connection with FIGS. 4-7. FIG. 4 is a flowchart of a method for reducing the helper data size by treating a certain fraction of reliable bits as being unreliable. FIG. 5 is a flowchart of a method for bit-specific across-temperature BER characterization that enables HDS reduction and other fuzzy extractor optimizations. FIG. 6 is a graph depicting individual cell's maximum across-temperature BERs plotted against nominal-temperature one-probabilities. FIG. 7 is a flowchart of a method for reducing the helper data size for strong PUFs.

As stated above, FIG. 4 is a flowchart of a method 400 for reducing the helper data size by treating a certain fraction of reliable bits as being unreliable in accordance with an embodiment of the present invention.

Method 400 is a method corresponding to the present invention's joint HDS reduction and BER minimization algorithm referred above. The essential idea is a lossy compression: extra reliable bits can be traded for reduced HDS on reliability masks.

Referring to FIG. 4, in conjunction with FIGS. 1-3, in step 401, the individual cell bit-error-rates of a physical unclonable function (PUF) is determined.

In step 402, a lossy compression problem is formulated to seek an optimal reliability map representation. An example of such a lossy compression problem is an integer linear programming (ILP) problem. In one embodiment, the lossy compression problem is formulated using the determined individual cell bit-error-rates of the PUF to seek an optimal mask representation. While the following discusses a formulation based on ILP and/or the solution based on generating a codebook (e.g., randomized codebook), such as based on a rate of compression and determined cell-specific BERs, the present invention is not to be limited in scope to such embodiments. Instead, the present invention may utilize other lossy compression problem formulations.

In one embodiment, the ILP seeks an optimal mapping from SRAM segments into codewords in the generated codebook. The ILP problem seeks to minimize the average worst-case error rate of selected SRAM cells under the constraint of a sufficient number of "reliable" bits retained by the ILP problem. "Reliable bits," as used herein, refer to the bits that are retained by the compression algorithm for use in the fuzzy extractor as opposed to the low-reliability bits.

In step 403, the formulated lossy compression problem is solved. For example, a Lagrangian relaxation method is used for solving the integer linear programming problem to further reduce the number of bits storing helper data in a memory of a PUF system.

In step 404, a solution to the formulated lossy compression problem as the compressed map representing reliable cells is stored in a memory (e.g., memory 104) of the PUF system (e.g., PUF system 100).

In step 405, helper data to be utilized by the fuzzy extractor is constructed using the stored map and the error correction code helper data.

A more detailed discussion regarding method 400 is provided below in connection with the discussion of Algorithm 1.

The algorithm of the present invention, shown below in Algorithm 1, proceeds by partitioning a sequence of SRAM cells with size n into k segments, each of length l=n/k. It consists of two phases: (1) a codebook construction step enabling compact expression of reliability masks, and (2) an error minimization step that maps the reliability mask of each segment of SRAM cells to one codeword from the codebook.

The lossy compression algorithm defines a lossy ratio D (0<D<1) as the target ratio of further discarded reliable bits. For example, C=0.5 and D=0.5 means that 50% raw bits are considered reliable and among all reliable bits 50% of them are discarded, namely, 25% of the original raw bits are finally utilized.

The codebook C is designed to contains an all-zero vector $0^l$ and $(2^{lR(D)}-1)$ random sampled vectors of length l, in which R(D) is defined as:

$$R(D) = H(C) - (1 - C + CD)H\left(\frac{1-C}{1-C+CD}\right),$$

lR(D) bits are able to represent a codeword via indexing since the codebook C has the cardinality of $|C|=2^{lR(D)}$. Therefore, significant reduction of HDS for reliability mask requires that R(D)<<1. Each coordinate $C[j]_k$ of each non-zero codeword C[j] follows an i.i.d. binary distribution that $Pr(C[j]_k=1=C\pm CD$ Similar to masks constructed via the dark-bit masking, a "1" in a codeword means that the corresponding SRAM cell is masked as reliable and selected for the key generation.

Algorithm 1:

| Algorithm 1 Lossy compression for HDS reduction |
| --- |
| 1: procedure LOSSYCOMPRESS($p_w$, M, n, N, l, C, D) |
| 2:     Sample codebook C; |
| 3:     L ← 0, R ← 1, $n_\lambda$ ← 0; |
| 4:     while ($n_\lambda \neq$ n) do |
| 5:         λ ← (L+R)/2; |
| 6:         $n_\lambda$ ← 0 |
| 7:         for (i = 1; i ≤ N/l; i + +) do |
| 8:             for (j = 1; j = $2^{lR(D)}$; j + +) do |
| 9:                 $S_{ij} = \Sigma_{k=1}^{l} p_{w,ik} C[j]_k$; |
| 10:             end for |
| 11:             j* = arg min,(($S_{ij}$ − λHW(C[t]))); |
| 12:             M[i] ← C[j*]; |
| 13:             $n_\lambda$ ← $n_\lambda$ + HW(C[j*]); |
| 14:         end for |
| 15:         if ($n_\lambda$ < n) then |
| 16:             L ← λ; |
| 17:         end if |
| 18:         if ($n_\lambda$ > n) then |
| 19:             R ← λ; |
| 20:         end if |
| 21:     end while |
| 22: end procedure |

After the codebook construction, the second phase takes individual BERs as input and pursues an optimal mapping of reliability masks for each segment of SRAM cells, in order to achieve the overall BER minimization. The binary decision variables $x_{ij}$'s, $\forall i \in [k]$, $j \in [|C|]$ are defined to indicate the encoding of the mask M[i] from the i-th segment of SRAM cells:

$x_{ij}=1$, iff $Enc(M[i])=C[j]$.

As previously mentioned, encoding M[i] with a j-th codeword C[j] provides HW(C[j]) reliable output bits with the corresponding sum of BERs $S_{ij}$ as $$S_{ij} = \sum_{k=1}^{l} p_{w,ik} C[j]_k,$$

in which $p_{w,ik}$ denotes the worst-case BER of the k-th source bit in the i-th segment M[i].

The optimization seeking the optimal effective BER under the constraint of a sufficient number of reliable output bits is formulated as an integer linear programming problem:

$$\min_{x_{i,j}} \sum_{i,j} S_{ij}, x_{ij}$$

$$\text{s.t.} \sum_{i,j} HW(C[j])x_{ij} \geq n,$$

$$\sum_{j} x_{ij} = 1, \forall i \in [k]$$

$$x_{ij} \in \{0, 1\}.$$

The objective function $$\sum_{i,j} S_{ij} x_{ij}$$

effectively represents the average worst-case BER across all retained bits. To see that, consider that since the algorithm constrains on the total number of reliable bits $$\sum_{i,j} HW(C[j])x_{ij}$$

optimizing over the sum of BERs for reliable bits is the same as optimizing over the average BER. The constraint $$\sum_{j} x_{ij} = 1$$

implies that only one $x_{ij}$ is assigned to 1, namely, each segment M[i] decodes to a unique codeword $C_j$.

A greedy heuristic can be applied to efficiently solve the proposed ILP problem via Lagrangian relaxation. The major challenge of the ILP formulation above lies in the constraint $$\sum_{i,j} HW(C[j])x_{ij} \geq n,$$

which couples all decision variables $x_{ij}$'s. The standard technique in constrained optimization problems is to introduce Lagrangian regularizers to move complex constraints onto the objective function. After introducing a non-negative λ, the proposed ILP formation becomes $$\min_{x_{ij}} \sum_{i,j} S_{ij} x_{ij} - \lambda \left( \sum_{i,j} HW(C[j])x_{ij} \geq n \right)$$

$$\text{s.t.} \sum_{j} x_{ij} = 1, \forall i \in [k]$$

$$x_{ij} \in \{0, 1\}.$$

L(λ) is denoted to be the optimal objective value with Lagrangian regularizer λ. By grouping terms with respect to $x_{ij}$'s, solving for L(λ) can be decomposed into small subproblems $L_i(\lambda)$'s only with decision variables $\{x_{i1}, x_{i2}, \ldots\}$ inside the i-th segment, $$L_i(\lambda) = \min_{x_{ij}} \sum_{j} (S_{ij} - \lambda HW(C[j]))x_{ij}$$

$$\text{s.t.} \sum_{j} x_{ij} = 1,$$

$$x_{ij} \in \{0, 1\}.$$

Due to the binary constraints on $x_{ij}$, the i-th sub-problem $L_i(\lambda)$ identifies the index j with minimum ($S_{ij}$−λHW(C|j|)):

$$x_{ij} = \begin{cases} 1 & j = \text{argmin}_t((S_{it} - \lambda HW(c[t]))), \\ 0 & \text{otherwise.} \end{cases}$$

The optimal choice of λ can be found via efficient binary search in interval [0,1]. Therefore, the greedy-based heuristic runs in near-linear time.

The approach discussed above leads to an optimal HDS reduction but requires a possibly expensive characterization effort in which the reliability information for each bit of every production PUF chip is extracted across all conditions.

The following is a discussion of a technique for an economically feasible process of bit-specific across-temperature BER characterization needed for HDS reduction and other fuzzy extractor optimization strategies, including lossy compression.

FIG. 5 is a flowchart of a method 500 for bit-specific across-temperature BER characterization that enables HDS reduction and other fuzzy extractor optimizations in accordance with an embodiment of the present invention.

Referring to FIG. 5, in conjunction with FIGS. 1-3, in step 501, a population-based analysis is performed to extract cell specific nominal one-probabilities and worst-case bit-error-rates at the technology development phase.

In step 502, statistics, such as the mean $\mu_\rho$ and standard deviation $\sigma_\rho$, of the worst-case bit-error-rates for cells under the same nominal one-probability $\rho$, are extracted at the technology development phase.

In step 503, only nominal one-probabilities for each cell are measured at the production phase.

In step 504, the extracted mean $\mu_p$ is used as input for a helper data size reduction method for cells with nominal p to select reliable bits at the production phase.

In step 505, the confidence level of the true effective BER (target BER) is computed at the production phase using only statistics extracted in the technology phase and nominal p's. The following discussion is based on the average of $\mu_p$ for selected reliable bits being computed at the production phase but the present invention can utilize any other confidence level estimation tool. For example, the present invention may utilize $\bar{\mu}_p = \Sigma u_p/n$ for the selected set of reliable bits. Then an offset v is computed to satisfy $P(\bar{p}_w - \bar{\mu}_p > v) \leq \delta$ for a given confidence level $\delta$ via a stochastic concentration theory at the production phase. And then an error correction code with a corresponding target bit-error-rate is designed at the production phrase, where the target bit-error-rate is set for the error correction code as $p_t = \bar{\mu}_p + v$.

In step 506, the fuzzy extractor is optimized by identifying a subset of more reliable bits out of the population of PUF bits using the derived confidence level for the average across-temperature BER of the set of cells.

A more detailed discussion regarding method 500 is provided below.

Method 500 is a technique based on stochastic modeling of worst-case BERs to drive the lossy compression via measurements performed only under room temperature while allowing key reconstruction with overwhelmingly high probability. For every instance with obtained average BER $$\bar{p}_w = \Sigma_{i=1}^n p_{wi}/n \leq p_t$$

the reconstruction probability guarantee is met. Specifically, it is shown that for a practical number of cells involved, using the estimate of $\bar{p}_w$, this technique ensures that $$Pr(\bar{p}_w \leq p_t) \geq 1-\delta,$$

in which $\delta \ll 1$ is the fraction of PUF chips for which reliable reconstruction cannot be guaranteed. It is shown that $\delta$ can be set to a value that ensures almost-perfect reconstruction rate, for example, $\delta = 10^{-5}$.

This technique utilizes the correlation between maximum (worst-case) BERs with their nominal one-probabilities. FIG. 6 is a graph depicting individual cell's maximum across-temperature BERs plotted against nominal-temperature one-probabilities in accordance with an embodiment of the present invention.

Such a technique includes performing a population-based analysis of SRAM cells at the technology development phase, to get for each cell the nominal one-probability $p_i$ and worst-case $p_{wi}$ with respect to enrollment under nominal temperature. For cells under each fixed nominal one-probability p, the average $\mu_p$ and standard deviation $\sigma_p$ of worst-case $p_w$'s are extracted. At the production phase, individual one-probabilities $p_i$'s are measured under nominal temperature for each chip. For cells with nominal p, we use $\mu_p$ to estimate $p_w$. Namely, $\{\mu_{p1}, \mu_{p2}, \ldots\}$ are sent into the HDS reduction strategies, including the lossy compression described above, instead of $\{p_{w1}, p_{w2}, \ldots\}$ to select SRAM bits as input to the fuzzy extractor. For the set of selected cells, $\bar{\mu}_p$ is computed by $$\bar{\mu}_p = \Sigma_{i=1}^n \mu_{p_i}/n$$

For given confidence level $\delta$, an offset v is computed to satisfy $P(\bar{p}_w - \bar{\mu}_p > v) \leq \delta$, via the Bennett's inequality in the stochastic concentration theory. Then the target BER for ECC of fuzzy extractors can be set as $p_t = \bar{\mu}_p + v$.

The offset v can be obtained using stochastic concentration theory, and in one rendering of the present invention using the Bennett's inequality:

A computation based on the Bennett's inequality: Let $X_1, X_2, \ldots, X_n$ be independent random variables with zero mean, and $X_i \leq 1$ almost surely $\forall i \in [n]$. Let $$\sigma^2 = \Sigma_{i=1}^n Var(X_i)/n.$$

Then for any $t > 0$, $$Pr\left(\sum_{i=1}^n X_i > t\right) \leq \exp\left(-n\sigma^2 h\left(\frac{t}{n\sigma^2}\right)\right),$$

in which $h(u) = (1+u) \log(1+u) - u$ for $u > 0$.

$X_i = p_{wi} - \mu_{pi}$ denotes the deviation of $p_{wi}$ from its predicted alternative $\mu_{pii}$, and $$Var(X_i) = \sigma_{p_i}^2.$$

The derivation $\bar{p}_w - \bar{\mu}_p$ is just $\Sigma_{i=1}^n X_i$

Take $$t = \phi(n)(\Sigma_{i=1}^n \sigma_{p_i})$$

and let the upper bound for all $\sigma_p$ of selected SRAM cells to be $\sigma$, $$Pr(\bar{p}_w - \bar{\mu}_p > t) = Pr\left(\sum_{i=1}^n X_i > \phi(n)\left(\sum_{i=1}^n \sigma_{p_i}\right)\right) \leq \exp\left(-n\sigma^2 h\left(\frac{\phi(n)}{\sigma}\right)\right).$$

Therefore, it is shown that with increase of n, $\bar{p}_w$ converges to $\bar{\mu}_p$ exponentially fast.

Second, for given n and $\delta$, it is shown how to derive u analytically and drive the flow iteratively by increasing n when the reliability guarantee is not met for current bit-selection. Under the proposed condition $\bar{\mu}_p + v \leq p_t$, the event $\bar{p}_w > p_t$ implies that $\bar{p}_w - \bar{\mu}_p > v$. Namely, $Pr(\bar{p}_w > p_t) \leq Pr(\bar{p}_w - \bar{\mu}_p > v)$.

In order to satisfy the constraint $$Pr(\bar{p}_w - \mu_p > v) \leq \delta,$$

it is sufficient to set $u = \phi(n)\sigma$ and get $$Pr(\bar{p}_w - \hat{\mu}_p > v) = \leq \exp\left(-n\sigma^2 h\left(\frac{\phi(n)}{\sigma}\right)\right) \leq \delta$$

Optimal values of $\phi(n)$ and $v$ can be determined via the equation above.

As a result of the present invention, there is a dramatic reduction in the amount of helper data that needs to be stored in non-volatile memory and/or one-time-programmable memory, such as EPROM or e-Fuse. The cost of such memory is high in both silicon area (cost) and post-manufacture-time configuration. As a result of the present invention, memory consumption is reduced thereby improving the functionality or capability of a PUF system. That is, by reducing memory consumption, the efficiency of the PUF system is improved.

Furthermore, as a result of the present invention, the effective average BER that needs to be handled by error-correction coding within a fuzzy extractor is reduced. This allows a reduction of implementation cost of the fuzzy extractor.

Additionally, the present invention improves the prediction accuracy, i.e., the present invention reliability estimates the bit-error-rate of the physical unclonable function under environmental variations using high-dimensional stochastic modeling. The present invention is able to reliably estimate the worst-case error rate thereby allowing a significant cost (in terms of throughput, power, energy, silicon area, and price) reduction by enabling bit-selection based algorithms.

The following is a discussion of further applying the HDS reduction methods to strong PUFs.

Referring now to FIG. 7, FIG. 7 is a flowchart of a method 700 for helper data size reduction for strong PUFs in accordance with an embodiment of the present invention.

In step 701, pseudo random numbers are generated, for example, by using linear feedback shift registers. In one embodiment, a pre-defined sequence of m-bit binary strings is generated, where m corresponds to the number of challenge bits of the strong PUF. As a result, each state of the pseudo random generator corresponds to a unique challenge response pair for the strong PUF with its unique bit-error-rate.

In step 702, the generated pseudo random numbers are inputted to the strong PUF as challenges.

In step 703, the strong PUF outputs a sequence of responses to the given input challenges above that are stored in a one-dimensional indexed array. In one embodiment, each array element in the array corresponds to the response to a unique input challenge as the state of the pseudo random generator.

In step 704, the techniques of compression and economically-feasible confidence interval estimation are applied to form a most compact representation of the sufficiently reliable challenge response pairs of the strong PUF as entries of the abstract array.

In step 705, such a representation is stored as reduced helper data in memory (e.g., memory 104 of FIG. 1) of a PUF system (e.g., PUF system 100 of FIG. 1).

The descriptions of the various embodiments of the present invention have been presented for purposes of illustration, but are not intended to be exhaustive or limited to the embodiments disclosed. For example, many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for reducing the amount of helper data that needs to be stored, the method comprising:
   determining individual cell bit-error-rates of a physical unclonable function;
   formulating a lossy compression problem using said determined individual cell bit-error-rates of said physical unclonable function, wherein said lossy compression problem is an integer linear programming problem;
   solving said formulated lossy compression problem;
   storing a solution to said formulated lossy compression problem as a map representing reliable cells in a memory of a physical unclonable function system;
   constructing helper data to be utilized by a fuzzy extractor using said map representing reliable cells and error correction code helper data;
   generating a codebook using said determined individual cell bit-error-rates of said physical unclonable function;
   formulating said lossy compression problem to seek an optimal mapping from memory segments into codewords in said generated codebook; and
   using a Lagrangian relaxation method for solving said integer linear programming problem to reduce a number of bits of said helper data.

2. A computer program product for reducing the amount of helper data that needs to be stored, the computer program product comprising a computer readable storage medium having program code embodied therewith, the program code comprising the programming instructions for:
   determining individual cell bit-error-rates of a physical unclonable function;
   formulating a lossy compression problem using said determined individual cell bit-error-rates of said physical unclonable function, wherein said lossy compression problem is an integer linear programming problem;
   solving said formulated lossy compression problem;
   storing a solution to said formulated lossy compression problem as a map representing reliable cells in a memory of a physical unclonable function system;
   constructing helper data to be utilized by a fuzzy extractor using said map representing reliable cells and error correction code helper data;
   generating a codebook using said determined individual cell bit-error-rates of said physical unclonable function;
   formulating said lossy compression problem to seek an optimal mapping from memory segments into codewords in said generated codebook; and
   using a Lagrangian relaxation method for solving said integer linear programming problem to reduce a number of bits of said helper data.

3. A system, comprising:
   a memory unit for storing a computer program for reducing the amount of helper data that needs to be stored; and
   a processor coupled to the memory unit, wherein the processor is configured to execute the program instructions of the computer program comprising:

determining individual cell bit-error-rates of a physical unclonable function;

formulating a lossy compression problem using said determined individual cell bit-error-rates of said physical unclonable function, wherein said lossy compression problem is an integer linear programming problem;

solving said formulated lossy compression problem;

storing a solution to said formulated lossy compression problem as a map representing reliable cells in a memory of a physical unclonable function system;

constructing helper data to be utilized by a fuzzy extractor using said map representing reliable cells and error correction code helper data;

generating a codebook using said determined individual cell bit-error-rates of said physical unclonable function;

formulating said lossy compression problem to seek an optimal mapping from memory segments into codewords in said generated codebook; and using a Lagrangian relaxation method for solving said integer linear programming problem to reduce a number of bits of said helper data.

* * * * *

UNITED STATES PATENT AND TRADEMARK OFFICE
CERTIFICATE OF CORRECTION

PATENT NO. : 11,522,725 B2
APPLICATION NO. : 16/498587
DATED : December 6, 2022
INVENTOR(S) : Orshansky et al.

It is certified that error appears in the above-identified patent and that said Letters Patent is hereby corrected as shown below:

In the Specification

Please replace "$10^{0.5}$" after the phrase "while allowing key reconstruction to fail in only" at Column 5, Line 5 with "$10^{-5}$".

Please replace "$$P_{Fail} = 1 - F(t; n, p_e) = \sum_{i=t+1}^{n} \binom{n}{i} p_e^i (1-p_e)^{(n-i)},$$" after the phrase "Therefore, the failure rate $P_{Fail}$ of reconstruction" at Column 6, Line 55 with "$$P_{Fail} = 1 - F(t; n, p_e) = \sum_{i=t+1}^{n} \binom{n}{i} p_e^i (1-p_e)^{(n-i)},$$".

Please replace "$Pr(C[j]_k=1-C\pm CD$" at Column 10, Line 64 with "$Pr(C[j]_k= 0) =1- C +CD$".

Please replace "$Pr(\hat{p}_w - \hat{\mu}_p > v) = \leq \exp\left(-n\sigma^2 h\left(\frac{\phi(n)}{\sigma}\right)\right) \leq \delta$" at Column 15, Line 7 with "$Pr(\hat{p}_w - \hat{\mu}_p > v) \leq \exp\left(-n\sigma^2 h\left(\frac{\phi(n)}{\sigma}\right)\right) \leq \delta$".

Signed and Sealed this
Thirteenth Day of February, 2024

*Katherine Kelly Vidal*
Katherine Kelly Vidal
*Director of the United States Patent and Trademark Office*